(12) United States Patent
Iwasawa et al.

(10) Patent No.: US 7,177,091 B2
(45) Date of Patent: Feb. 13, 2007

(54) ZOOM LENS AND IMAGING DEVICE

(75) Inventors: Yoshito Iwasawa, Tokyo (JP);
Nobuyuki Adachi, Tokyo (JP);
Masayuki Murata, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/212,875

(22) Filed: Aug. 29, 2005

(65) Prior Publication Data

US 2006/0050405 A1 Mar. 9, 2006

(30) Foreign Application Priority Data

Sep. 7, 2004 (JP) ............... 2004-259938

(51) Int. Cl.
*G02B 15/14* (2006.01)
(52) U.S. Cl. .................... 359/680; 359/689
(58) Field of Classification Search ........ 359/680–683, 359/689, 676, 781, 761
See application file for complete search history.

(56) References Cited

U.S. PATENT DOCUMENTS 6,844,986 B2 * 1/2005 Nanba ................. 359/689
6,943,962 B2 * 9/2005 Sekita ................. 359/689
6,989,943 B2 * 1/2006 Itoh .................... 359/689
2003/0218799 A1 11/2003 Sensui et al.

FOREIGN PATENT DOCUMENTS

| JP | 2002-244043 | 8/2002 |
| JP | 2002-350726 | 12/2002 |
| JP | 2004-004765 | 1/2004 |

OTHER PUBLICATIONS

European Search Report, Dated Dec. 21, 2005.

* cited by examiner

*Primary Examiner*—Ricky Mack
*Assistant Examiner*—M. Hasan
(74) *Attorney, Agent, or Firm*—Rader Fishman & Grauer PLLC; Ronald P. Kananen

(57) ABSTRACT

Disclosed is a zoom lens having a first lens group having a negative refractive power, a second lens group having a positive refractive power, and a third lens group having a positive refractive power arranged in the mentioned order from an object side, wherein the first lens group includes a negative lens and a positive lens having at least one aspherical surface arranged in the mentioned order from the object side and satisfies a following inequality (1):

$$0.4 < D1/fw < 0.66 \qquad (1)$$

where D1 represents a distance, inside the first lens group, between a lens surface closest to an object and a lens surface closest to an image, and fw represents a focal distance with the zoom lens set to a wide-angle position.

18 Claims, 13 Drawing Sheets

SPHERICAL ABERRATION

ASTIGMATISM

DISTORTION

SPHERICAL ABERRATION

ASTIGMATISM

DISTORTION

ZOOM LENS AND IMAGING DEVICE

CROSS REFERENCES TO RELATED APPLICATIONS

The present invention contains subject matter related to Japanese Patent Application JP 2004-259938 filed in the Japanese Patent Office on Sep. 7, 2004, the entire contents of which being incorporated herein by reference.

BACKGROUND OF THE INVENTION

1. Field of the Invention

The present invention related to a novel zoom lens and imaging device. More particularly, it relates to a compact, inexpensive zoom lens with a variable power ratio of about three suitable for use with a digital still camera or the like and an imaging device using the zoom lens.

2. Description of the Related Art

Recent years have witnessed a wide diffusion of imaging devices, such as digital still cameras, which are equipped with a solid-state image pickup device. As such digital still cameras equipped with a solid-state image pickup device become more popular than before, they are required to offer an increasingly high image quality. Particularly, those digital still cameras equipped with a solid-state image pickup device having a large number of pixels need an imaging lens, especially a zoom lens, with good image-forming performance. With a demand for compact devices, particularly thin ones, being strong, zoom lenses are also required to be compact with a small thickness while offering high performance. Furthermore, a demand is also high for lenses which are easy to produce.

A zoom lens which is smaller in size and higher in image forming performance than conventionally known zoom lenses is disclosed in patent document 1. The zoom lens is a three-group zoom lens including a first lens group having a negative refractive power, a second lens group having a positive refractive power, and a third lens group having a positive refractive power arranged in the mentioned order from an object side. In the zoom lens, however, the negative lens disposed closer than the other lenses to the object has an aspherical layer made of resin. Thus, adequate cost reduction has not been made of the zoom lens.

Patent document 2 discloses another three-group zoom lens including a first lens group having a negative refractive power, a second lens group having a positive refractive power, and a third lens group having a positive refractive power arranged in the mentioned order from an object side. In the zoom lens, however, the negative lens disposed closer than the other lenses to the object has a concave surface with a strong curvature formed with a glass lens having an aspherical surface. Producing such a glass lens involves a high degree of difficulty.

Patent document 3 discloses a still another three-group zoom lens including a first lens group having a negative refractive power, a second lens group having a positive refractive power, and a third lens group having a positive refractive power. An aspherical surface included in the first lens group of the zoom lens is formed on a positive lens, so that difficulty involved in producing a lens with an aspherical surface has been reduced. In the zoom lens, however, each of the lens groups is thick, so that miniaturizing the zoom lens in a retracted state is difficult.

[Patent document 1] Japanese Patent Laid-Open No. 2002-350726

[Patent document 2] Japanese Patent Laid-Open No. 2002-244043

[Patent document 3] Japanese Patent Laid-Open No. 2004-4765

SUMMARY OF THE INVENTION

Under the circumstances, there is a need for providing a zoom lens with a variable power ratio of about three which is suitable for use with an imaging device using a solid-state image pickup device such as a digital video camera and a digital still camera and which is compact, low-priced, and easy to produce.

According to an embodiment of the present invention, there is provided a zoom lens which includes a first lens group having a negative refractive power, a second lens group having a positive refractive power, and a third lens group having a positive refractive power arranged in the mentioned order from an object side. The first lens group includes a negative lens and a positive lens having at least one aspherical surface arranged in the mentioned order from the object side and satisfies the following inequality (1):

$$0.4 < D1/fw < 0.66 \quad (1)$$

where D1 represents a distance, inside the first lens group, between a lens surface closest to an object and a lens surface closest to an image, and fw represents a focal distance with the zoom lens set to the wide-angle position.

According to another embodiment of the present invention, there is provided an imaging device which includes a zoom lens and an image pickup device which converts an optical image formed by the zoom lens into an electrical signal. The zoom lens includes a first lens group having a negative refractive power, a second lens group having a positive refractive power, and a third lens group having a positive refractive power arranged in the mentioned order from an object side. The first lens group includes a negative lens and a positive lens having at least one aspherical surface arranged in the mentioned order from the object side, and satisfies the following inequality (1):

$$0.4 < D1/fw < 0.66 \quad (1)$$

where D1 represents a distance, inside the first lens group, between a lens surface closest to an object and a lens surface closest to an image, and fw represents a focal distance with the zoom lens set to the wide-angle position.

Thus, according to these embodiments of the present invention, a compact, inexpensive and easy-to-produce zoom lens can be provided and, by using the zoom lens, a compact, easy-to-produce imaging device can be provided.

A zoom lens according to still another embodiment of the present invention includes a first lens group having a negative refractive power, a second lens group having a positive refractive power, and a third lens group having a positive refractive power arranged in the mentioned order from an object side with each of the lens groups including at least one positive lens having aspherical surfaces on both sides.

An imaging device according to still another embodiment of the present invention includes a zoom lens and an image pickup device which converts an optical image formed by the zoom lens into an electrical signal. The zoom lens includes a first lens group having a negative refractive power, a second lens group having a positive refractive power, and a third lens group having a positive refractive power arranged in the mentioned order from an object side. Each of the lens groups includes at least one positive lens having aspherical surfaces on both sides.

Therefore, according to these embodiments of the present invention, a compact, inexpensive and easy-to-produce zoom lens can be provided and, by using the zoom lens, a compact, easy-to-produce imaging device can be provided.

According to still another embodiment of the present invention, there is provided a zoom lens which includes a first lens group having a negative refractive power, a second lens group having a positive refractive power, and a third lens group having a positive refractive power arranged in the mentioned order from an object side. The first lens group includes a negative lens and a positive lens having at least one aspherical surface arranged in the mentioned order from the object side and satisfies the following inequality (1):

$$0.4 < D1/fw < 0.66 \quad (1)$$

where D1 represents a distance, inside the first lens group, between a lens surface closest to an object and a lens surface closest to an image, and fw represents a focal distance with the zoom lens set to the wide-angle position.

According to still another embodiment of the present invention, there is provided an imaging device which includes a zoom lens and an image pickup device which converts an optical image formed by the zoom lens into an electrical signal. The zoom lens includes a first lens group having a negative refractive power, a second lens group having a positive refractive power, and a third lens group having a positive refractive power arranged in the mentioned order from an object side. The first lens group includes a negative lens and a positive lens having at least one aspherical surface arranged in the mentioned order from the object side, and satisfies the following inequality (1):

$$0.4 < D1/fw < 0.66 \quad (1)$$

where D1 represents a distance, inside the first lens group, between a lens surface closest to an object and a lens surface closest to an image, and fw represents a focal distance with the zoom lens set to the wide-angle position.

Therefore, according to these embodiments of the present invention, a high-performance zoom lens which is compact, easy-to-produce and inexpensive can be provided and, by using the zoom lens, a high-performance imaging device which is compact, easy-to-produce and inexpensive can be provided.

A zoom lens according to a still another embodiment of the present invention includes a first lens group having a negative refractive power, a second lens group having a positive refractive power, and a third lens group having a positive refractive power arranged in the mentioned order from an object side with each of the lens groups including at least one positive lens having aspherical surfaces on both sides.

An imaging device according to still another embodiment of the present invention includes a zoom lens and an image pickup device which converts an optical image formed by the zoom lens into an electrical signal. The zoom lens includes a first lens group having a negative refractive power, a second lens group having a positive refractive power, and a third lens group having a positive refractive power arranged in the mentioned order from an object side. Each of the lens groups includes at least one positive lens having aspherical surfaces on both sides.

Therefore, according to these embodiments of the present invention, a high-performance zoom lens which is compact, easy-to-produce and inexpensive can be provided and, by using the zoom lens, a high-performance imaging device which is compact, easy-to-produce and inexpensive can be provided.

Each of the lens groups included in a zoom lens according to embodiments of the present invention includes a positive lens having at least one aspherical surface, so that aberrations can be corrected easily.

According to embodiments of the present invention, the second lens group includes a cemented lens which includes a positive lens and at least one negative lens. The cemented lens satisfies the following inequalities (2) and (3):

$$0.05 < |Ndp - Ndn| < 0.4 \quad (2)$$

$$2.0 < |vdp - vdn| < 50.0 \quad (3)$$

where

Ndp is a refractive index for d-line of the positive lens included in the cemented lens, Ndn is a refractive index for d-line of the negative lens included in the cemented lens, vdp is a Abbe's number of the positive lens included in the cemented lens, and vdn is an Abbe's number of the negative lens included in the cemented lens.

Therefore, various kinds of aberrations, astigmatism and chromatic aberration of magnification in particular, can be corrected easily.

According to embodiments of the present invention, each of the lens groups is movable during zooming operations, so that various kinds of aberrations can be properly corrected while securing a magnification of about three.

BRIEF DESCRIPTION OF THE DRAWINGS

Embodiments of the present invention will be described in detail based on the following figures, wherein.

DESCRIPTION OF THE PREFERRED EMBODIMENTS

Figure 1:
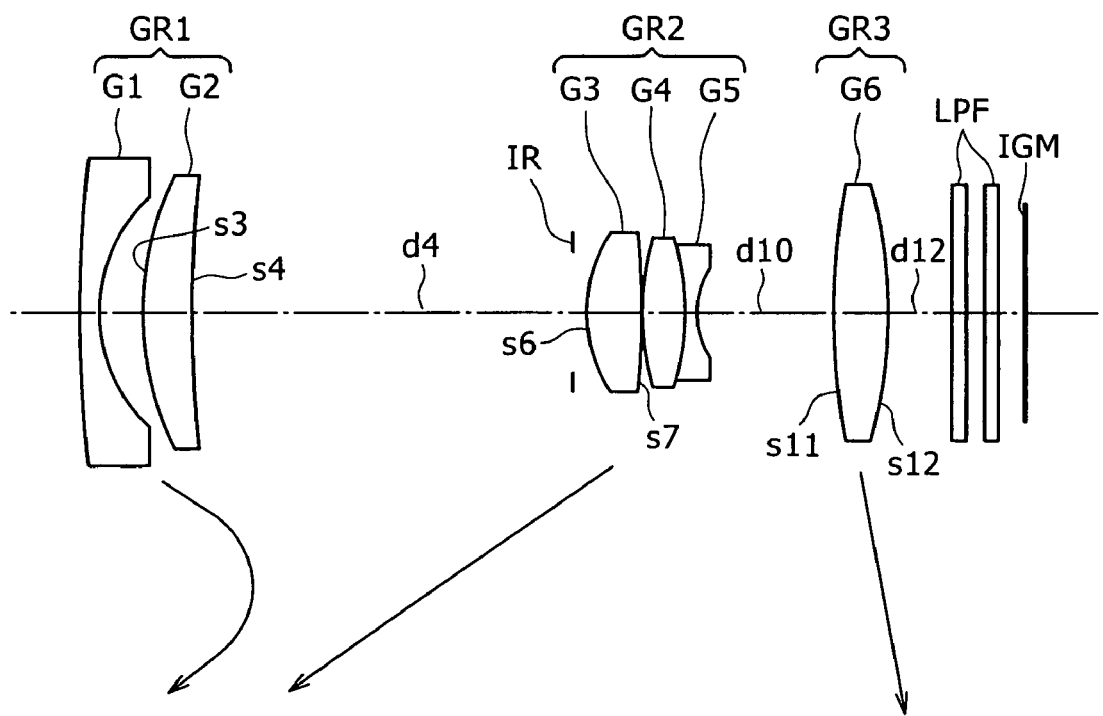
FIG. 1 which, along with FIGS. 2 to 4, illustrates a first embodiment of a zoom lens according to the present invention is a schematic diagram showing a lens arrangement.

The preferred embodiments of the present invention will be described in the following with reference to the accompanying drawings.

A zoom lens according to one embodiment of the present invention includes a first lens group GR1 having a negative refractive power, a second lens group GR2 having a positive refractive power, and a third lens group GR3 having a positive refractive power arranged in the mentioned order from an object side. The first lens group includes a negative lens G1 and a positive lens G2 arranged in the mentioned order from the object side, at least one side of the positive lens G2 forming an aspherical surface. The positive lens G2 satisfies the following inequality:

$$0.4 < D1/fw < 0.66 \qquad (1)$$

where D1 represents the distance, inside the first lens group, between the lens surface closest to an object and the lens surface closest to an image, and fw represents the focal distance with the zoom lens set to the wide-angle position.

According to the one embodiment of the present invention, the aspherical surface of the first lens group GR1 is formed on the positive lens G2, so that it can be produced with ease.

The inequality (1) defines the total length of the first lens group GR1. It is preferable to make the total length of the first lens group GR1 as short as possible so as to reduce the thickness of the zoom lens in a retracted state. Making the total length shorter than the smallest value satisfying the inequality (1), however, increases performance deterioration attributable to an eccentricity error and spherical aberration or lens back fluctuations attributable to spacing errors, as a result, to cause a very high assembly accuracy to be required. Making the total length longer than the largest value satisfying the inequality (1) increases the thickness of the first lens group GR1, so that it becomes difficult to make the zoom lens compact in a retracted state.

Each of the lens groups included in the zoom lens according to the one embodiment of the present invention is preferred to include a positive lens having at least one aspherical surface. Such an arrangement makes correcting various kinds of aberrations easier. Furthermore, using a process in which an aspherical surface is formed into a positive lens does not cause difficulty involved in the lens production to increase.

A zoom lens according to another embodiment of the present invention includes a first lens group GR1 having a negative refractive power, a second lens group GR2 having a positive refractive power, and a third lens group GR3 having a positive refractive power arranged in the mentioned order from an object side. Each of the lens groups includes at least one positive lens having aspherical surfaces on both sides.

The zoom lens according to the another embodiment of the present invention can be made up of a small number of lenses, and it can be made compact. With each of the lens groups having at least two aspherical surfaces, aberrations can be properly corrected even with a small number of lenses and, even when the power of each lens is increased, aberrations can be corrected with ease. It is therefore possible, by increasing the power of each lens and thereby increasing the variable power ratio with respect to a lens group displacement, to reduce the total length of the zoom lens, that is, to make the zoom lens compact. Furthermore, with each of the lenses which have aspherical surfaces on both sides being a positive lens, the difficulty involved in the lens production does not increase.

The second lens group GR2 included in the zoom lens according to the one and the another embodiments of the present invention is preferred to have a cemented lens which includes a positive lens and at least one negative lens with the cemented lens satisfying the following inequalities (2) and (3):

$$0.05 < |Ndp - Ndn| < 0.4 \qquad (2)$$

$$2.0 < |vdp - vdn| < 50.0 \qquad (3)$$

where,

Ndp is a refractive index for d-line of the positive lens included in the cemented lens Ndn is a refractive index for d-line of the negative lens included in the cemented lens vdp is an Abbe's number of the positive lens included in the cemented lens vdn is a Abbe's number of the negative lens included in the cemented lens The above inequalities (2) and (3) define the refractive index and Abbe's number, respectively, for each of the lenses included in the cemented lens making up the second lens group GR2. When the items included in the above inequalities do not satisfy the condition defined by the corresponding inequality, it is difficult to correct astigmatisms and chromatic aberrations of magnification.

Furthermore, each of the lens groups included in the zoom lens according to the one and the another embodiments of the present invention is preferred to be movable during zooming operation. With such an arrangement made, it is possible to properly correct various kinds of aberrations while securing a magnification of about three.

The zoom lenses according to the preferred embodiments of the present invention and examples of relevant numerical values will be described in the following with reference to FIGS. 1 to 16 and Tables 1 to 13.

Symbols used in expressing the example numerical values and their meanings are as follows.

FNo is a F number
f is a focal length
ω is a half field angle
si is an i-th surface counted from the object side
ri is a radius of curvature of the surface i
di is a distance between i-th surface and (i+1)th surface counted from the object side
ni is a refractive index for d-line (with a wave length of 587.6 nm) of i-th lens
vi is an Abbe's number for d-line (with a wave length of 587.6 nm) of i-th lens The shape of the aspherical surface is defined by the formula below.

$$x = \frac{y^2 \cdot c^2}{1+(1-\varepsilon \cdot y^2 \cdot c^3)^{1/2}} + \Sigma A^i \cdot Y^i$$

where,
- x is a distance from the vertex of the lens surface measured in the optical axis
- y is a height measured in the direction perpendicular to the optical axis
- c is a paraxial curvature measured at the lens vertex
- ε is a conic constant
- $A^i$ is an i-th aspherical constant FIG. 1 is a diagram showing a lens arrangement according to a first embodiment. The zoom lens according to the first embodiment includes a first lens group GR1 having a negative refractive power, a second lens group GR2 having a positive refractive power, and a third lens group GR3 having a positive refractive power arranged in the mentioned order from an object side. The first lens group GR1 includes a negative lens G1 having a concave surface with a strong curvature on its side toward the image and a positive lens G2 having aspherical surfaces on both sides. The second lens group GR2 includes a positive lens G3 having aspherical surfaces on both sides and a cemented lens including a positive lens G4 and a negative lens G5. The third lens group GR3 includes a positive lens G6 having aspherical surfaces on both sides. The lens groups each move, as shown by the arrows in FIG. 1, toward the optical axis during a zooming operation from the wide-angle end to the telephoto end. An aperture stop IR is disposed close to the object side of the second lens group GR2. During a zooming operation, the aperture stop IR moves together with the second lens group GR2. In FIG. 1, LPF denotes a low-pass filter inserted between the third lens group GR3 and an imaging surface IMG.

Table 1 shows optical system data obtained as example 1 of numerical values by applying concrete numerical values to the arrangement according to the first embodiment. In the following tables, "ASP" denotes an aspherical surface and "INFINITY" a flat surface.

TABLE 1

| si | ri | di | ni | vi |
|---|---|---|---|---|
| 1 | r1 = 97.908 | d1 = 1.000 | n1 = 1.88300 | v1 = 40.805 |
| 2 | r2 = 8.718 | d2 = 1.900 | | |
| 3 | r3 = 16.853(ASP) | d3 = 2.120 | n2 = 1.84666 | v2 = 23.785 |
| 4 | r4 = 76.391 | d4 = variable | | |
| 5 | r5 = INFINITY | d5 = 0.700 | | Aperture stop |
| 6 | r6 = 6.793(ASP) | d6 = 2.300 | n3 = 1.69350 | v3 = 53.201 |
| 7 | r7 = −32.527(ASP) | d7 = 0.100 | | |
| 8 | r8 = 14.319 | d8 = 1.920 | n4 = 1.83500 | v4 = 42.984 |
| 9 | r9 = −17.689 | d9 = 0.450 | n5 = 1.71736 | v5 = 29.501 |
| 10 | r10 = 4.370 | d10 = variable | | |
| 11 | r11 = 28.936(ASP) | d11 = 2.280 | n6 = 1.58313 | v6 = 59.461 |
| 12 | r12 = −19.529(ASP) | d12 = variable | | |
| 13 | r13 = INFINITY | d13 = 0.440 | n7 = 1.44524 | v7 = 27.700 |
| 14 | r14 = INFINITY | d14 = 0.900 | | |
| 15 | r15 = INFINITY | d15 = 0.500 | n8 = 1.56883 | v8 = 56.000 |
| 16 | r16 = INFINITY | | | |

In the arrangement according to the first embodiment, a surface distance d4 between the first lens group GR1 and the aperture stop IR, a surface distance d10 between the second lens group GR2 and the third lens group GR3, and a surface distance d12 between the third lens group GR3 and the low-pass filter LPF are variable during a zooming operation. Table 2 shows values, obtained as the example 1 of numerical values, of the surface distances d4, d10, and d12 with the zoom lens set, respectively, to the wide-angle position, an intermediate focal position between the wide-angle position and the telephoto position, and the telephoto position, along with relevant values of the focal length f, F number FNo, and half field angle ω.

TABLE 2

| f | 8.10 | 13.77 | 23.38 |
|---|---|---|---|
| FNo | 2.84 | 3.80 | 5.25 |
| ω(degrees) | 30.11 | 18.10 | 10.83 |
| d4 | 16.644 | 7.557 | 1.200 |
| d10 | 6.041 | 12.773 | 21.362 |
| d12 | 3.027 | 1.852 | 1.410 |

In the arrangement according to the first embodiment, each of the lens groups includes at least one positive lens having aspherical surfaces on both sides. Namely, surfaces s3 and s4 on both sides of the positive lens G2 included in the first lens group GR1, surfaces s6 and s7 on both sides of the positive lens G3 included in the second lens group GR2, and surfaces s11 and s12 on both sides of the positive lens G6 included in the third lens group GR3 are aspherical. Table 3 shows aspherical coefficients of the surfaces s3, s4, s6, s7, s11, and s12 of the fourth, sixth, eighth, and tenth orders along with relevant values of the conic constant ε.

TABLE 3

| si | ε | $A^4$ | $A^6$ | $A^8$ | $A^{10}$ |
|---|---|---|---|---|---|
| 3 | 1 | −0.137795 × $10^{-4}$ | −0.250697 × $10^{-5}$ | 0.673366 × $10^{-7}$ | −0.931222 × $10^{-4}$ |
| 4 | 1 | −0.130106 × $10^{-3}$ | −0.313046 × $10^{-4}$ | 0.763561 × $10^{-7}$ | −0.139694 × $10^{-4}$ |
| 6 | 1 | −0.436263 × $10^{-3}$ | −0.845243 × $10^{-5}$ | −0.281344 × $10^{-6}$ | −0.258805 × $10^{-7}$ |

TABLE 3-continued

| si | ϵ | $A^4$ | $A^6$ | $A^8$ | $A^{10}$ |
|---|---|---|---|---|---|
| 7 | 1 | $0.593702 \times 10^{-4}$ | $-0.411160 \times 10^{-5}$ | $-0.788869 \times 10^{-6}$ | $0.470671 \times 10^{-8}$ |
| 11 | 1 | $-0.145421 \times 10^{-3}$ | $0.410292 \times 10^{-5}$ | $-0.721106 \times 10^{-7}$ | $0.202766 \times 10^{-8}$ |
| 12 | 1 | $-0.195226 \times 10^{-5}$ | $-0.421473 \times 10^{-5}$ | $0.220414 \times 10^{-6}$ | $-0.178025 \times 10^{-8}$ |

Figure 2:
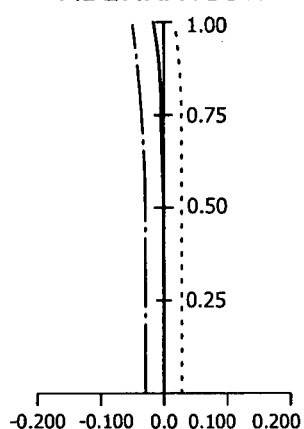
FIG. 2 includes diagrams showing a spherical aberration, an astigmatism, and a distortion with the zoom lens set to the wide-angle position.
Figure 2:
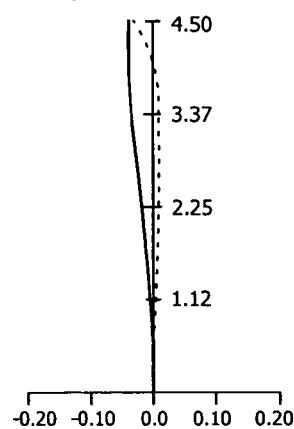
Figure 2:
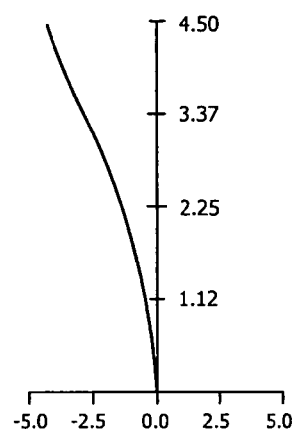
Figure 3:
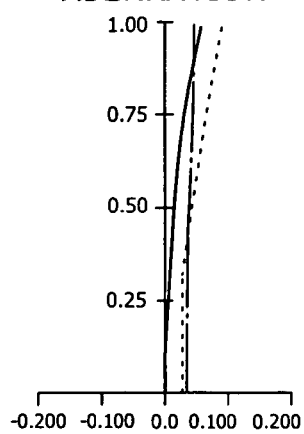
FIG. 3 includes diagrams showing a spherical aberration, an astigmatism, and a distortion with the zoom lens set to an intermediate focal position between the wide-angle position and the telephoto position.
Figure 3:
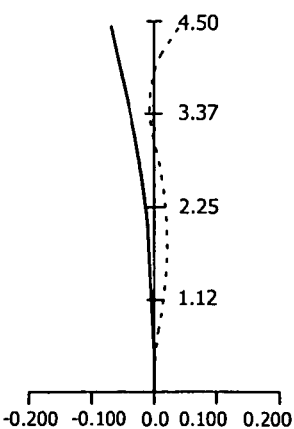
Figure 3:
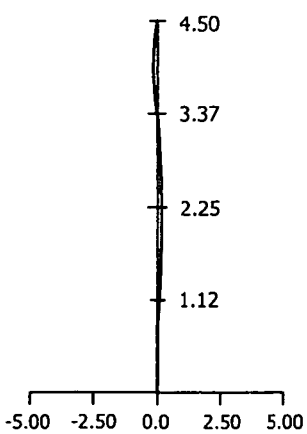
Figure 4:
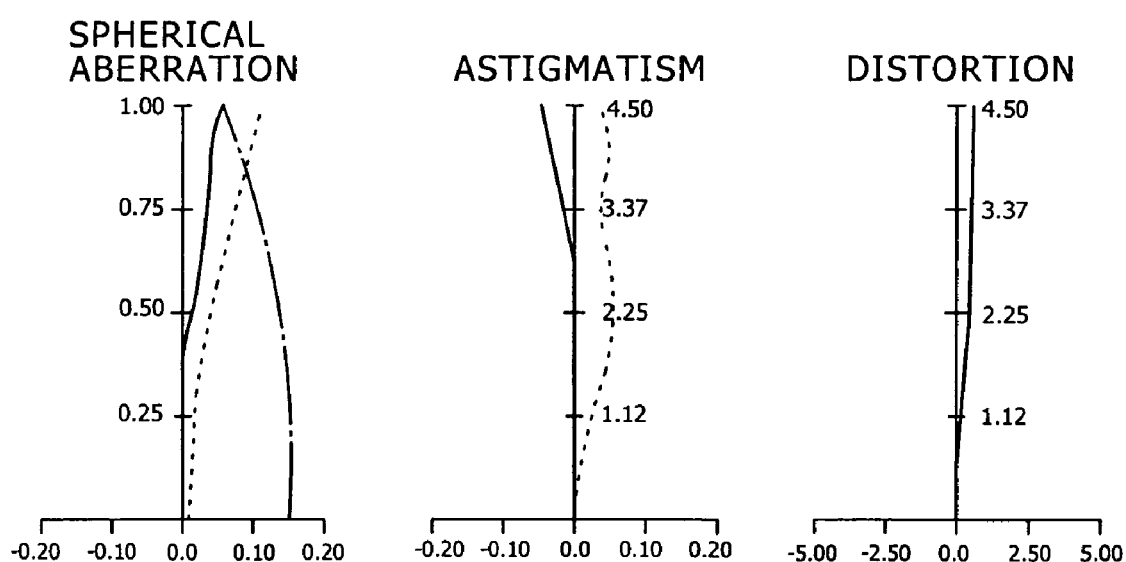
FIG. 4 includes diagrams showing a spherical aberration, an astigmatism, and a distortion with the zoom lens set to the telephoto position.

Each of FIGS. 2 to 4 includes diagrams showing aberrations according to the example 1 of numerical values. FIG. 2 shows aberrations with the zoom lens set to the wide-angle position. FIG. 3 shows aberrations with the zoom lens set to an intermediate focal position between the wide-angle position and the telephoto position. FIG. 4 shows aberrations with the zoom lens set to the telephoto position. In each of the diagrams showing spherical aberrations, the ordinate represents the ratio to the open F value and the abscissa represents the defocus, and the solid line, broken line, and chain line represent respectively spherical aberrations due to d-line, c-line, and g-line. In each of the diagrams showing astigmatisms, the ordinate represents the image height and the abscissa represents the focus, and the solid line and broken line represent respectively the sagittal image surface and the meridional image surface. In each of the diagrams showing distortions, the ordinate represents the image height and the abscissa represents the distortion (%).

Figure 5:
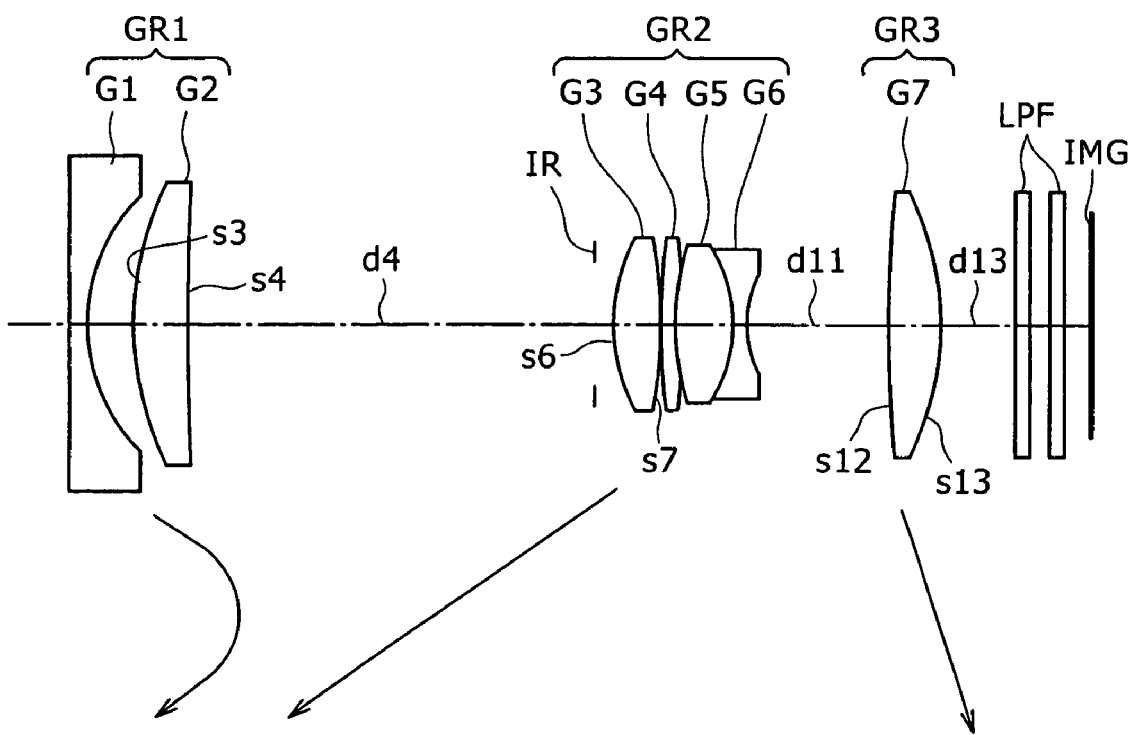
FIG. 5 which, along with FIGS. 6 to 8, illustrates a second embodiment of a zoom lens according to the present invention is a schematic diagram showing a lens arrangement.

FIG. 5 is a diagram showing a lens arrangement according to a second embodiment. The zoom lens according to the second embodiment includes a first lens group GR1 having a negative refractive power, a second lens group GR2 having a positive refractive power, and a third lens group GR3 having a positive refractive power arranged in the mentioned order from an object side. The first lens group GR1 includes a negative lens G1 having a concave surface with a strong curvature on its side toward the image and a positive lens G2 having aspherical surfaces on both sides. The second lens group GR2 includes a positive lens G3 having aspherical surfaces on both sides and a cemented lens including three lenses, that is, a negative lens G4, a positive lens G5, and a negative lens G6. The third lens group GR3 includes a positive lens G7 having aspherical surfaces on both sides.

The lens groups each move, as shown by the arrows in FIG. 5, toward the optical axis during zooming operation from the wide-angle end to the telephoto end. An aperture stop IR is disposed close to the object side of the second lens groups GR2. During a zooming operation, the aperture stop IR moves together with the second lens group GR2. In FIG. 5, LPF denotes a low-pass filter inserted between the third lens group GR3 and an imaging surface IMG.

Table 4 shows optical system data obtained as example 2 of numerical values by applying concrete numerical values to the arrangement according to the second embodiment.

TABLE 4

| si | ri | di | ni | vi |
|---|---|---|---|---|
| 1 | r1 = 152.449 | d1 = 1.000 | n1 = 1.88300 | v1 = 40.805 |
| 2 | r2 = 8.624 | d2 = 1.600 | | |
| 3 | r3 = 13.573(ASP) | d3 = 2.036 | n2 = 1.84666 | v2 = 23.785 |
| 4 | r4 = 42.045(ASP) | d4 = variable | | |
| 5 | r5 = INFINITY | d5 = 0.700 | | Aperture stop |
| 6 | r6 = 7.083(ASP) | d6 = 1.807 | n3 = 1.74330 | v3 = 49.326 |
| 7 | r7 = −26.607(ASP) | d7 = 0.113 | | |
| 8 | r8 = 33.694 | d8 = 0.450 | n4 = 1.84666 | v4 = 23.785 |
| 9 | r9 = 12.682 | d9 = 2.400 | n5 = 1.74400 | v5 = 44.899 |
| 10 | r10 = −5.550 | d10 = 0.450 | n6 = 1.62004 | v6 = 36.303 |
| 11 | r11 = 4.416 | d11 = variable | | |
| 12 | r12 = 98.009(ASP) | d12 = 2.000 | n7 = 1.58313 | v7 = 59.461 |
| 13 | r13 = −13.821(ASP) | d13 = variable | | |
| 14 | r14 = INFINITY | d14 = 0.440 | n8 = 1.44524 | v8 = 27.700 |
| 15 | r15 = INFINITY | d15 = 0.900 | | |
| 16 | r16 = INFINITY | d16 = 0.500 | n9 = 1.56883 | v9 = 56.000 |
| 17 | r17 = INFINITY | | | |

In the arrangement according to the second embodiment, a surface distance d4 between the first lens group GR1 and the aperture stop IR, a surface distance d11 between the second lens group GR2 and the third lens group GR3, and a surface distance d13 between the third lens group GR3 and the low-pass filter LPF are variable during a zooming operation. Table 5 shows values, obtained as the example 2 of numerical values, of the surface distances d4, d11, and d13 with the zoom lens set, respectively, to the wide-angle position, an intermediate focal position between the wide-angle position and the telephoto position, and the telephoto position, along with relevant values of the focal length f, F number FNo, and half field angle ω.

TABLE 5

| f | 8.10 | 13.77 | 23.38 |
|---|---|---|---|
| FNo | 2.81 | 3.72 | 5.15 |
| ω(degrees) | 30.09 | 17.99 | 10.82 |
| d4 | 16.201 | 7.156 | 1.240 |
| d11 | 5.590 | 11.627 | 19.928 |
| d13 | 2.971 | 2.096 | 1.610 |

In the arrangement according to the second embodiment, each of the lens groups includes at least one positive lens having aspherical surfaces on both sides. Namely, surfaces s3 and s4 on both sides of the positive lens G2 included in the first lens group GR1, surfaces s6 and s7 on both sides of the positive lens G3 included in the second lens group GR2, and surfaces s12 and s13 on both sides of the positive lens G7 included in the third lens group GR3 are aspherical. Table 6 shows aspherical coefficients of the surfaces s3, s4, s6, s7, s12, and s13 of the fourth, sixth, eighth, and tenth orders along with relevant values of the conic constant ϵ.

TABLE 6

| si | ϵ | $A^4$ | $A^6$ | $A^8$ | $A^{10}$ |
|---|---|---|---|---|---|
| 3 | 1 | $-0.295592 \times 10^{-4}$ | $0.139777 \times 10^{-5}$ | $-0.312825 \times 10^{-7}$ | $-0.117087 \times 10^{-4}$ |
| 4 | 1 | $-0.143609 \times 10^{-3}$ | $0.260304 \times 10^{-5}$ | $-0.141033 \times 10^{-6}$ | $0.377465 \times 10^{-4}$ |

TABLE 6-continued

| si | ϵ | $A^4$ | $A^6$ | $A^8$ | $A^{10}$ |
|---|---|---|---|---|---|
| 6 | 1 | $-0.339791 \times 10^{-3}$ | $0.125440 \times 10^{-4}$ | $-0.167390 \times 10^{-5}$ | $0.137528 \times 10^{-6}$ |
| 7 | 1 | $0.368606 \times 10^{-3}$ | $0.170640 \times 10^{-4}$ | $-0.175957 \times 10^{-5}$ | $0.175557 \times 10^{-6}$ |
| 12 | 1 | $-0.108551 \times 10^{-2}$ | $0.455345 \times 10^{-5}$ | $-0.262697 \times 10^{-5}$ | $0.872173 \times 10^{-8}$ |
| 13 | 1 | $0.128721 \times 10^{-3}$ | $-0.462071 \times 10^{-5}$ | $-0.239964 \times 10^{-7}$ | $0.613705 \times 10^{-8}$ |

Figure 6:
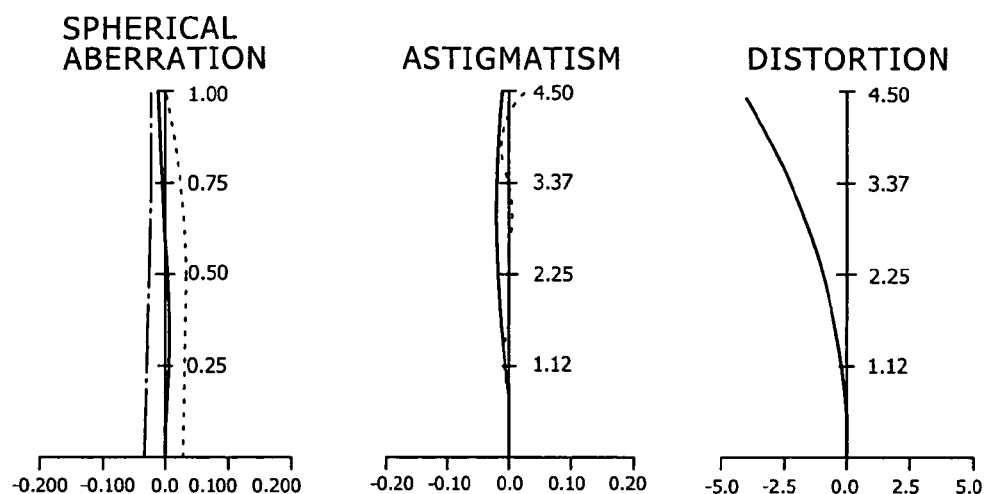
FIG. 6 includes diagrams showing a spherical aberration, an astigmatism, and a distortion with the zoom lens set to the wide-angle position.
Figure 7:
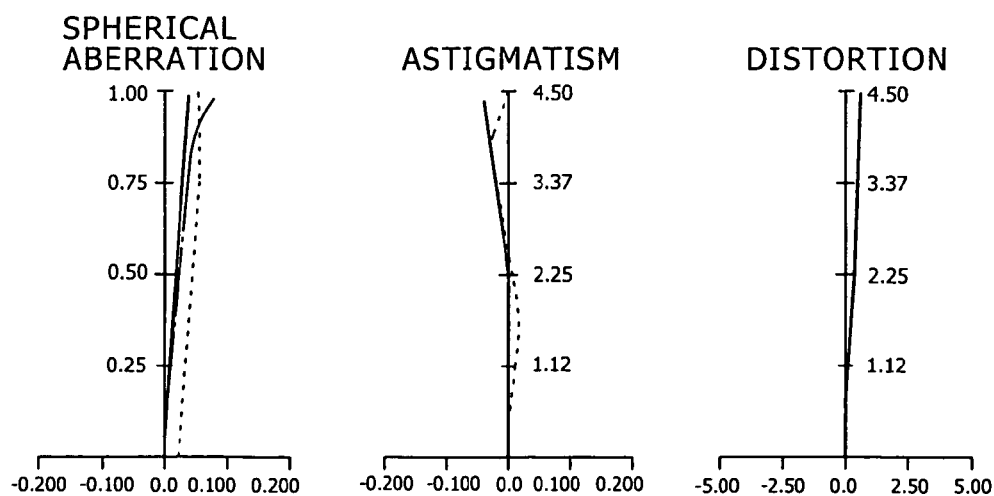
FIG. 7 includes diagrams showing a spherical aberration, an astigmatism, and a distortion with the zoom lens set to an intermediate focal position between the wide-angle position and the telephoto position.
Figure 8:
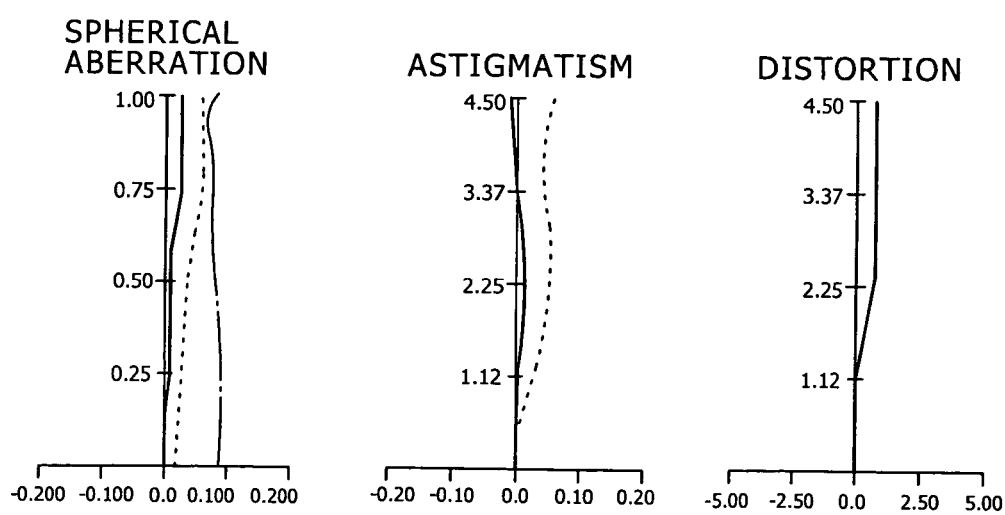
FIG. 8 includes diagrams showing a spherical aberration, an astigmatism, and a distortion with the zoom lens set to the telephoto position.

Each of FIGS. 6 to 8 includes diagrams showing aberrations according to the example 2 of numerical values. FIG. 6 shows aberrations with the zoom lens set to the wide-angle position. FIG. 7 shows aberrations with the zoom lens set to an intermediate focal position between the wide-angle position and the telephoto position. FIG. 8 shows aberrations with the zoom lens set to the telephoto position. In each of the diagrams showing spherical aberrations, the ordinate represents the ratio to the open F value and the abscissa represents the defocus, and the solid line, broken line, and chain line represent respectively spherical aberrations due to d-line, c-line, and g-line. In each of the diagrams showing astigmatisms, the ordinate represents the image height and the abscissa represents the focus, and the solid line and broken line represent respectively the sagittal image surface and the meridional image surface. In each of the diagrams showing distortions, the ordinate represents the image height and the abscissa represents the distortion (%).

Figure 9:
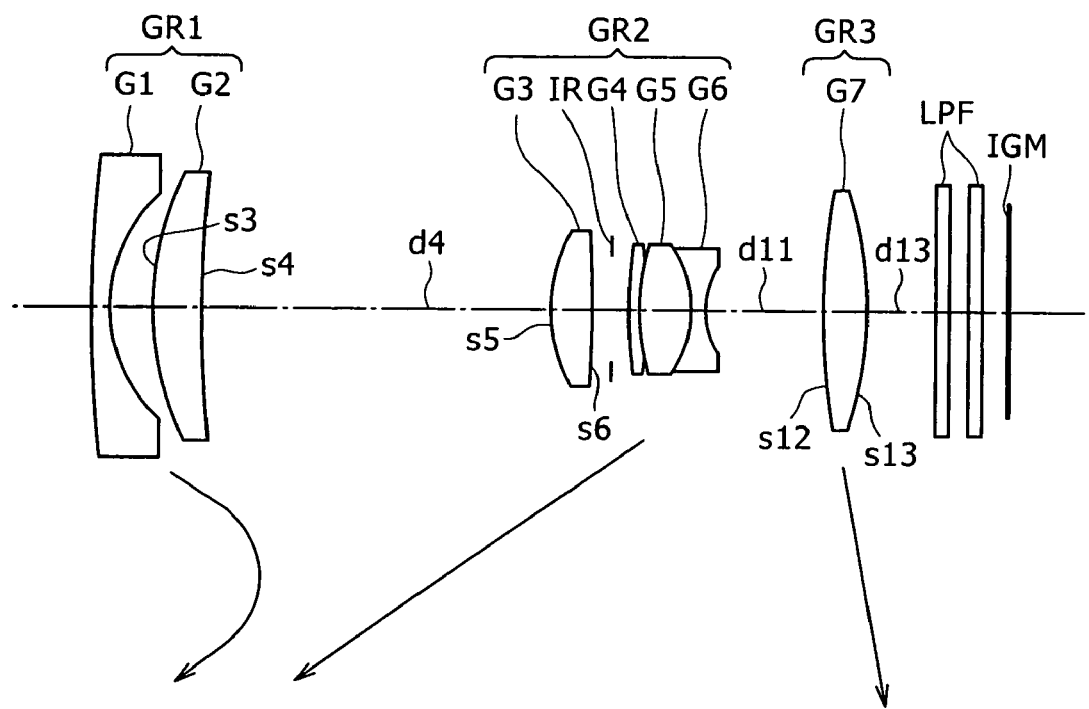
FIG. 9 which, along with FIGS. 10 to 12, illustrates a third embodiment of a zoom lens according to the present invention is a schematic diagram showing a lens arrangement.

FIG. 9 is a diagram showing a lens arrangement according to a third embodiment. The zoom lens according to the third embodiment includes a first lens group GR1 having a negative refractive power, a second lens group GR2 having a positive refractive power, and a third lens group GR3 having a positive refractive power arranged in the mentioned order from an object side. The first lens group GR1 includes a negative lens G1 having a concave surface with a strong curvature on its side toward the image and a positive lens G2 having aspherical surfaces on both sides. The second lens group GR2 includes a positive lens G3 having aspherical surfaces on both sides, an aperture stop IR, and a cemented lens including three lenses, that is, a negative lens G4, a positive lens G5, and a negative lens G6. The third lens group GR3 includes a positive lens G7 having aspherical surfaces on both sides.

The lens groups each move, as shown by the arrows in FIG. 9, toward the optical axis during zooming operation from the wide-angle end to the telephoto end. In FIG. 9, LPF denotes a low-pass filter inserted between the third lens group GR3 and an imaging surface IMG.

Table 7 shows optical system data obtained as example 3 of numerical values by appplying concrete numerical values to the arrangement according to the third embodiment.

TABLE 7

| si | ri | di | ni | vi |
|---|---|---|---|---|
| 1 | r1 = 62.907 | d1 = 1.000 | n1 = 1.88300 | v1 = 40.805 |
| 2 | r2 = 8.172 | d2 = 1.920 | | |
| 3 | r3 = 14.248(ASP) | d3 = 2.000 | n2 = 1.84666 | v2 = 23.785 |
| 4 | r4 = 40.365(ASP) | d4 = variable | | |
| 5 | r5 = 13.654(ASP) | d5 = 1.748 | n3 = 1.74330 | v3 = 49.326 |

TABLE 7-continued

| si | ri | di | ni | vi |
|---|---|---|---|---|
| 6 | r6 = −20.966(ASP) | d6 = 0.800 | | |
| 7 | r7 = INFINITY | d7 = 0.800 | | Aperture stop |
| 8 | r8 = 29.058 | d8 = 0.450 | n4 = 1.84666 | v4 = 23.785 |
| 9 | r9 = 7.764 | d9 = 2.500 | n5 = 1.83500 | v5 = 42.984 |
| 10 | r10 = −5.108 | d10 = 0.600 | n6 = 1.58144 | v6 = 40.891 |
| 11 | r11 = 4.949 | d11 = variable | | |
| 12 | r12 = 47.579(ASP) | d12 = 2.000 | n7 = 1.58313 | v7 = 59.461 |
| 13 | r13 = −17.195(ASP) | d13 = variable | | |
| 14 | r14 = INFINITY | d14 = 0.440 | n8 = 1.44524 | v8 = 27.700 |
| 15 | r15 = INFINITY | d15 = 0.900 | | |
| 16 | r16 = INFINITY | d16 = 0.500 | n9 = 1.56883 | v9 = 56.000 |
| 17 | r17 = INFINITY | | | |

In the arrangement according to the third embodiment, a surface distance d4 between the first lens group GR1 and the second lens group GR2, a surface distance d11 between the second lens group GR2 and the third lens group GR3, and a surface distance d13 between the third lens group GR3 and the low-pass filter LPF are variable during a zooming operation. Table 8 shows values, obtained as the example 3 of numerical values, of the surface distances d4, d11, and d13 with the zoom lens set, respectively, to the wide-angle position, an intermediate focal position between the wide-angle position and the telephoto position, and the telephoto position, along with relevant values of the focal length f, F number FNo, and half field angle ω.

TABLE 8

| f | 8.10 | 13.77 | 23.38 |
|---|---|---|---|
| FNo | 2.81 | 3.80 | 5.28 |
| ω(degrees) | 30.11 | 18.08 | 10.87 |
| d4 | 15.893 | 7.138 | 0.860 |
| d11 | 5.405 | 12.102 | 20.388 |
| d13 | 3.125 | 1.810 | 1.610 |

In the arrangement according to the third embodiment, each of the lens groups include at least one positive lens having aspherical surfaces on both sides. Namely, surfaces s3 and s4 on both sides of the positive lens G2 included in the first lens group GR1, surfaces s6 and s7 on both sides of the positive lens G3 included in the second lens group GR2, and surfaces s12 and s13 on both sides of the positive lens G7 included in the third lens group GR3 are aspherical. Table 9 shows aspherical coefficients of the surfaces s3, s4, s6, s7, s12, and s13 of the fourth, sixth, eighth, and tenth orders along with relevant values of the conic constant ϵ.

TABLE 9

| si | ϵ | $A^4$ | $A^6$ | $A^8$ | $A^{10}$ |
|---|---|---|---|---|---|
| 3 | 1 | $-0.380155 \times 10^{-4}$ | $-0.212398 \times 10^{-5}$ | $0.330147 \times 10^{-7}$ | $0.720479 \times 10^{-4}$ |
| 4 | 1 | $-0.152130 \times 10^{-3}$ | $-0.352306 \times 10^{-6}$ | $0.852648 \times 10^{-7}$ | $-0.525706 \times 10^{-4}$ |

TABLE 9-continued

| si | ϵ | $A^4$ | $A^6$ | $A^8$ | $A^{10}$ |
|---|---|---|---|---|---|
| 5 | 1 | $-0.243797 \times 10^{-3}$ | $0.187893 \times 10^{-4}$ | $0.699804 \times 10^{-4}$ | $0.106572 \times 10^{-6}$ |
| 6 | 1 | $0.287650 \times 10^{-3}$ | $0.323082 \times 10^{-4}$ | $-0.781620 \times 10^{-4}$ | $0.211420 \times 10^{-6}$ |
| 12 | 1 | $-0.237966 \times 10^{-3}$ | $-0.138857 \times 10^{-5}$ | $0.266614 \times 10^{-4}$ | $0.340161 \times 10^{-8}$ |
| 13 | 1 | $-0.137362 \times 10^{-3}$ | $-0.956568 \times 10^{-5}$ | $0.512864 \times 10^{-4}$ | $0.189727 \times 10^{-8}$ |

Figure 10:
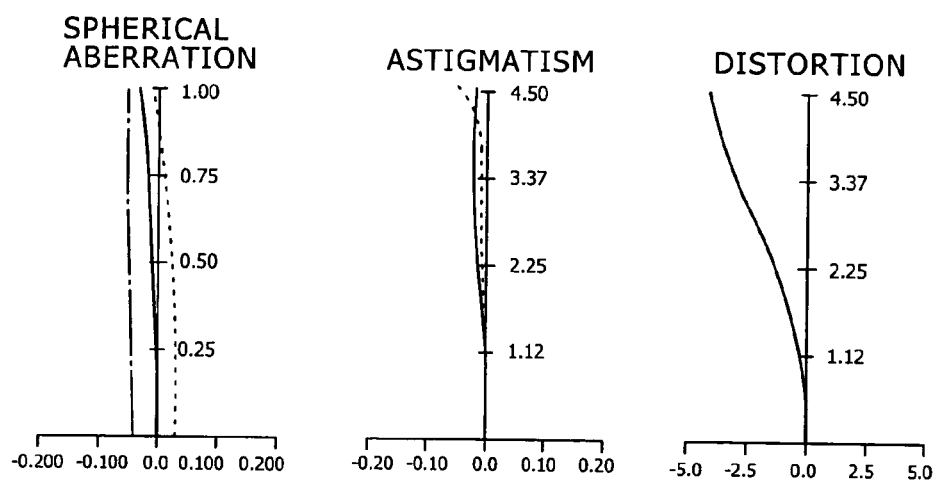
FIG. 10 includes diagrams showing a spherical aberration, an astigmatism, and a distortion with the zoom lens set to the wide-angle position.
Figure 11:
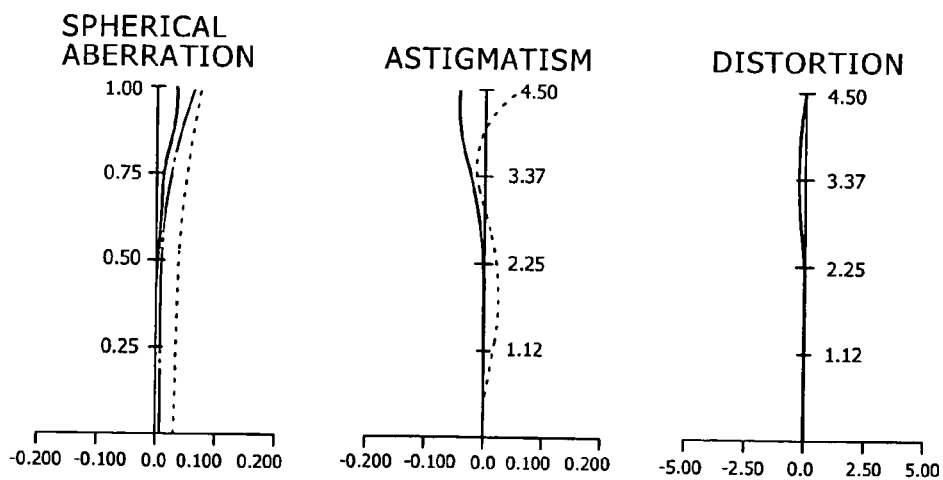
FIG. 11 includes diagrams showing a spherical aberration, an astigmatism, and a distortion with the zoom lens set to an intermediate focal position between the wide-angle position and the telephoto position.
Figure 12:
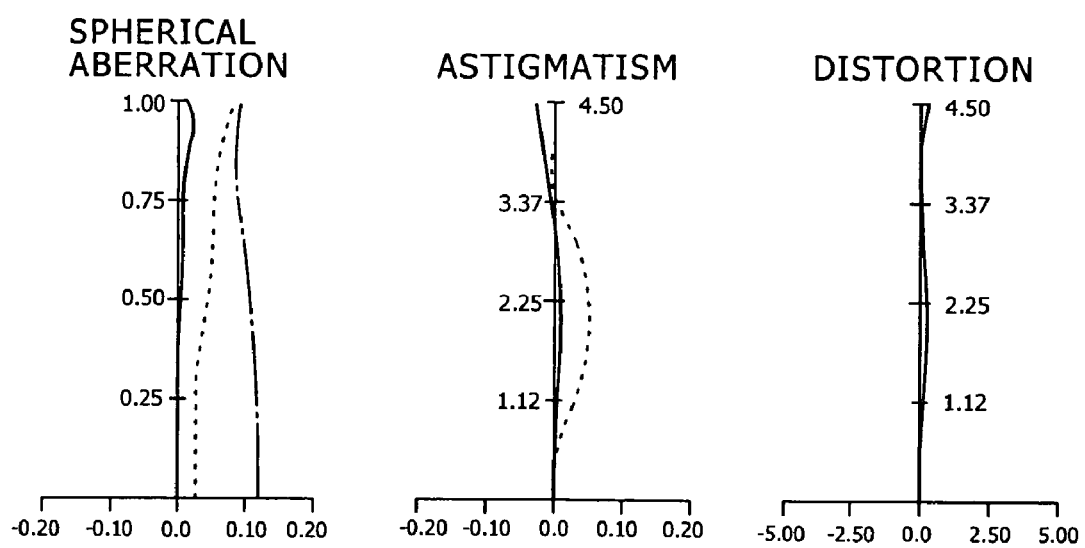
FIG. 12 includes diagrams showing a spherical aberration, an astigmatism, and a distortion with the zoom lens set to the telephoto position.

Each of FIGS. 10 to 12 includes diagrams showing aberrations according to the example 3 of numerical values. FIG. 10 shows aberrations with the zoom lens set to the wide-angle position. FIG. 11 shows aberrations with the zoom lens set to an intermediate focal position between the wide-angle position and the telephoto position. FIG. 12 shows aberrations with the zoom lens set to the telephoto position. In each of the diagrams showing spherical aberrations, the ordinate represents the ratio to the open F value and the abscissa represents the defocus, and the solid line, broken line, and chain line represent respectively spherical aberrations due to d-line, c-line, and g-line. In each of the diagrams showing astigmatisms, the ordinate represents the image height and the abscissa represents the focus, and the solid line and broken line represent respectively the sagittal image surface and the meridional image surface. In each of the diagrams showing distortions, the ordinate represents the image height and the abscissa represents the distortion (%).

Figure 13:
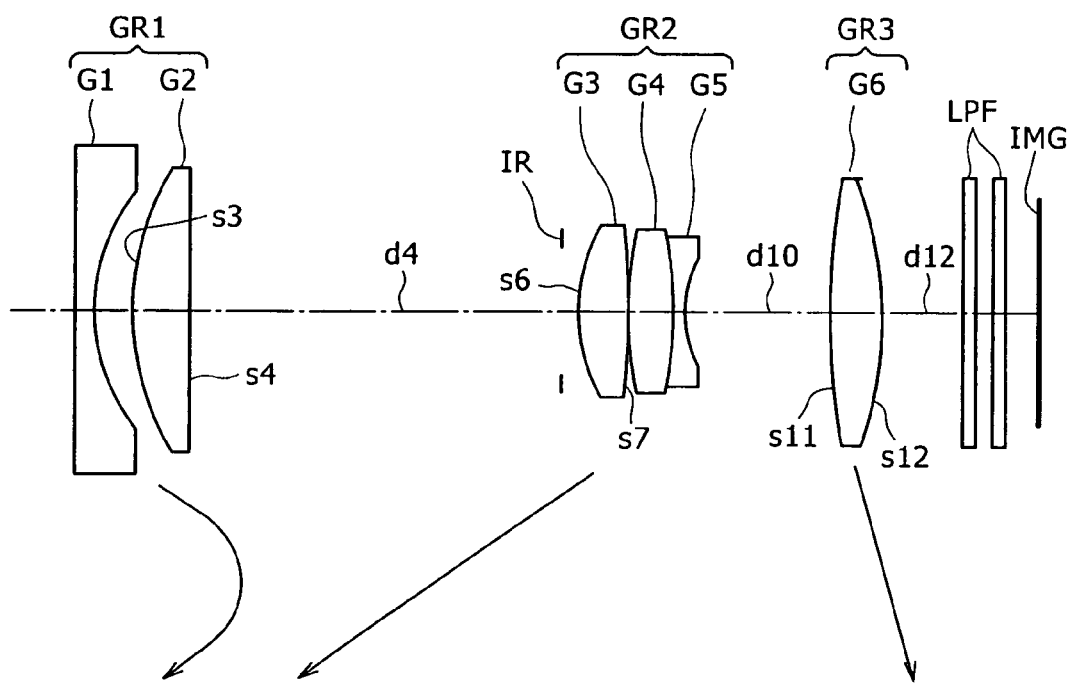
FIG. 13 which, along with FIGS. 14 to 16, illustrates a fourth embodiment of a zoom lens according to the present invention is a schematic diagram showing a lens arrangement.

FIG. 13 is a diagram showing a lens arrangement according to a fourth embodiment. The zoom lens according to the fourth embodiment includes a first lens group GR1 having a negative refractive power, a second lens group GR2 having a positive refractive power, and a third lens group GR3 having a positive refractive power arranged in the mentioned order from an object side. The first lens group GR1 includes a negative lens G1 having a concave surface with a strong curvature on its side toward the image and a positive lens G2 having aspherical surfaces on both sides. The second lens group GR2 includes a positive lens G3 having aspherical surfaces on both sides, and a cemented lens including a positive lens G4 and a negative lens G5. The third lens group GR3 includes a positive lens G6 having aspherical surfaces on both sides. The lens groups each move, as shown by the arrows in FIG. 13, toward the optical axis during a zooming operation from the wide-angle end to the telephoto end. An aperture stop IR is disposed close to the object side of the second lens group GR2. During a zooming operation, the aperture stop IR moves together with the second lens group GR2. In FIG. 13, LPF denotes a low-pass filter inserted between the third lens group GR3 and an imaging surface IMG.

Table 10 shows optical system data obtained as example 4 of numerical values by applying concrete numerical values to the arrangement according to the fourth embodiment.

TABLE 10

| si | ri | di | ni | vi |
|---|---|---|---|---|
| 1 | r1 = 25002.586 | d1 = 1.000 | n1 = 1.88300 | v1 = 40.805 |
| 2 | r2 = 8.590 | d2 = 1.520 | | |
| 3 | r3 = 14.240(ASP) | d3 = 2.054 | n2 = 1.80518 | v2 = 25.456 |
| 4 | r4 = 92.815(ASP) | d4 = variable | | |

TABLE 10-continued

| si | ri | di | ni | vi |
|---|---|---|---|---|
| 5 | r5 = INFINITY | d5 = 0.700 | | Aperture stop |
| 6 | r6 = 6.286(ASP) | d6 = 1.960 | n3 = 1.69350 | v3 = 53.201 |
| 7 | r7 = −38.213(ASP) | d7 = 0.100 | | |
| 8 | r8 = 14.243 | d8 = 1.840 | n4 = 1.83500 | v4 = 42.984 |
| 9 | r9 = −18.943 | d9 = 0.450 | n5 = 1.71736 | v5 = 29.501 |
| 10 | r10 = 4.283 | d10 = variable | | |
| 11 | r11 = 33.289(ASP) | d11 = 2.094 | n6 = 1.58313 | v6 = 59.461 |
| 12 | r12 = −16.782(ASP) | d12 = variable | | |
| 13 | r13 = INFINITY | d13 = 0.440 | n7 = 1.44524 | v7 = 27.700 |
| 14 | r14 = INFINITY | d14 = 0.900 | | |
| 15 | r15 = INFINITY | d15 = 0.500 | n8 = 1.56883 | v8 = 56.000 |
| 16 | r16 = INFINITY | | | |

In the arrangement according to the fourth embodiment, a surface distance d4 between the first lens group GR1 and the aperture stop IR, a surface distance d10 between the second lens group GR2 and the third lens group GR3, and a surface distance d12 between the third lens group GR3 and the low-pass filter LPF are variable during a zooming operation. Table 11 shows values, obtained as the example 4 of numerical values, of the surface distances d4, d10, and d12 with the zoom lens set, respectively, to the wide-angle position, an intermediate focal position between the wide-angle position and the telephoto position, and the telephoto position, along with relevant values of the focal length f, F number FNo, and half field angle ω.

TABLE 11

| f | 8.10 | 13.77 | 23.38 |
|---|---|---|---|
| FNo | 2.84 | 3.82 | 5.34 |
| ω(degrees) | 30.11 | 18.01 | 10.78 |
| d4 | 15.430 | 6.911 | 1.200 |
| d10 | 6.017 | 12.758 | 21.699 |
| d12 | 3.149 | 2.114 | 1.410 |

In the arrangement according to the fourth embodiment, each of the lens groups includes at least one positive lens having aspherical surfaces on both sides. Namely, surfaces s3 and s4 on both sides of the positive lens G2 included in the first lens group GR1, surfaces s6 and s7 on both sides of the positive lens G3 included in the second lens group GR2, and surfaces s11 and s12 on both sides of the positive lens G6 included in the third lens group GR3 are aspherical. Table 12 shows aspherical coefficients of the surfaces s3, s4, s6, s7, s11, and s12 of the fourth, sixth, eighth,, and tenth orders along with relevant values of the conic constant ϵ.

TABLE 12

| si | ϵ | $A^4$ | $A^6$ | $A^8$ | $A^{10}$ |
|---|---|---|---|---|---|
| 3 | 1 | $0.658483 \times 10^{-4}$ | $0.210777 \times 10^{-4}$ | $-0.115837 \times 10^{-6}$ | $0.487392 \times 10^{-4}$ |
| 4 | 1 | $-0.626962 \times 10^{-4}$ | $0.164299 \times 10^{-5}$ | $-0.130392 \times 10^{-4}$ | $0.533577 \times 10^{-4}$ |

TABLE 12-continued

| si | ϵ | $A^4$ | $A^6$ | $A^8$ | $A^{10}$ |
|---|---|---|---|---|---|
| 6 | 1 | $-0.425571 \times 10^{-3}$ | $-0.290453 \times 10^{-5}$ | $-0.630528 \times 10^{-7}$ | $0.157982 \times 10^{-7}$ |
| 7 | 1 | $0.183971 \times 10^{-3}$ | $0.275644 \times 10^{-7}$ | $-0.984890 \times 10^{-7}$ | $0.478345 \times 10^{-7}$ |
| 11 | 1 | $-0.160370 \times 10^{-4}$ | $-0.461347 \times 10^{-5}$ | $0.186329 \times 10^{-7}$ | $-0.298538 \times 10^{-7}$ |
| 12 | 1 | $0.222085 \times 10^{-3}$ | $-0.147753 \times 10^{-4}$ | $0.495225 \times 10^{-4}$ | $-0.680184 \times 10^{-7}$ |

Figure 14:
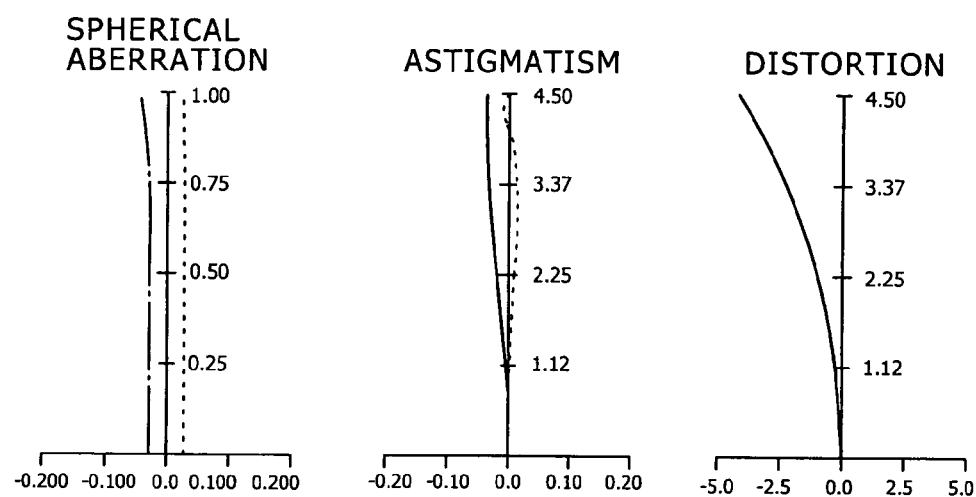
FIG. 14 includes diagrams showing a spherical aberration, an astigmatism, and a distortion with the zoom lens set to the wide-angle position.
Figure 15:
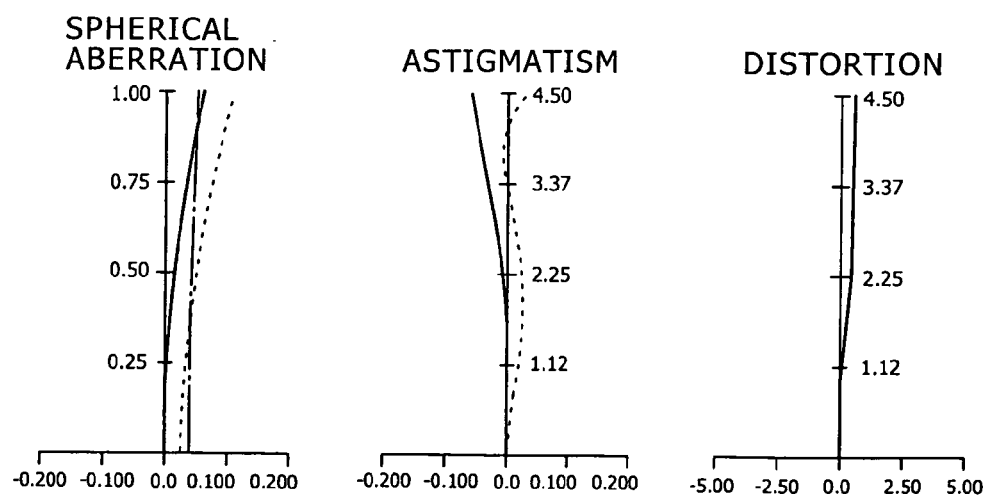
FIG. 15 includes diagrams showing a spherical aberration, an astigmatism, and a distortion with the zoom lens set to an intermediate focal position between the wide-angle position and the telephoto position.
Figure 16:
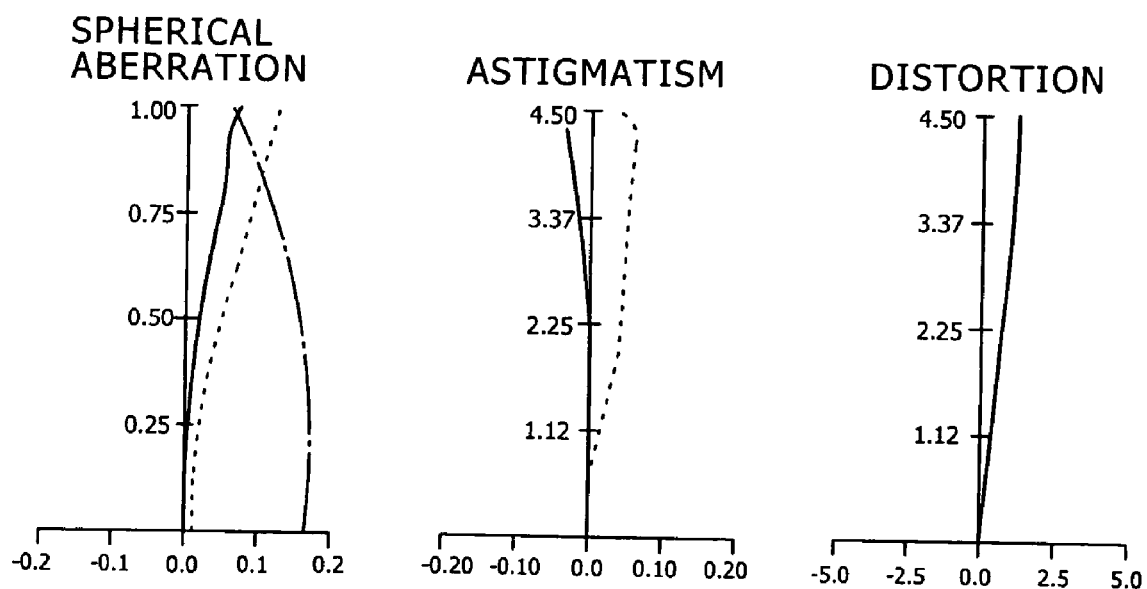
FIG. 16 includes diagrams showing a spherical aberration, an astigmatism, and a distortion with the zoom lens set to the telephoto position.

Each of FIGS. 14 to 16 includes diagrams showing aberrations according to the example 4 of numerical values. FIG. 14 shows aberrations with the zoom lens set to the wide-angle position. FIG. 15 shows aberrations with the zoom lens set to an intermediate focal position between the wide-angle position and the telephoto position. FIG. 16 shows aberrations with the zoom lens set to the telephoto position. In each of the diagrams showing spherical aberrations, the ordinate represents the ratio to the open F value and the abscissa represents the defocus, and the solid line, broken line, and chain line represent respectively spherical aberrations due to d-line, c-line, and g-line. In each of the diagrams showing astigmatisms, the ordinate represents the image height and the abscissa represents the focus, and the solid line and broken line represent respectively the sagittal image surface and the meridional image surface. In each of the diagrams showing distortions, the ordinate represents the image height and the abscissa represents the distortion (%).

Table 13 gives the values that, being based on the examples 1 to 4 of numerical values, correspond to the terms included in the inequalities (1), (2), and (3).

TABLE 13

| Terms in inequalities | Example 1 of numerical values | Example 2 of numerical values | Example 3 of numerical values | Example 4 of numerical values |
|---|---|---|---|---|
| D1/fw (1) | 0.620 | 0.572 | 0.607 | 0.565 |
| |Ndp − Ndn| (2) | 0.118 | 0.124 | 0.254 | 0.118 |
| |vdp − vdn| (3) | 13.483 | 8.596 | 2.093 | 13.483 |

As is clear from Table 13, the zoom lenses associated with the examples 1 through 4 of numerical values satisfy the inequalities (1), (2), and (3). Also, as shown in the relevant aberration diagrams, the aberrations with the zoom lens set, respectively, to the wide-angle position, an intermediate focal position between the wide-angle position and the telephoto position are properly corrected.

Figure 17:
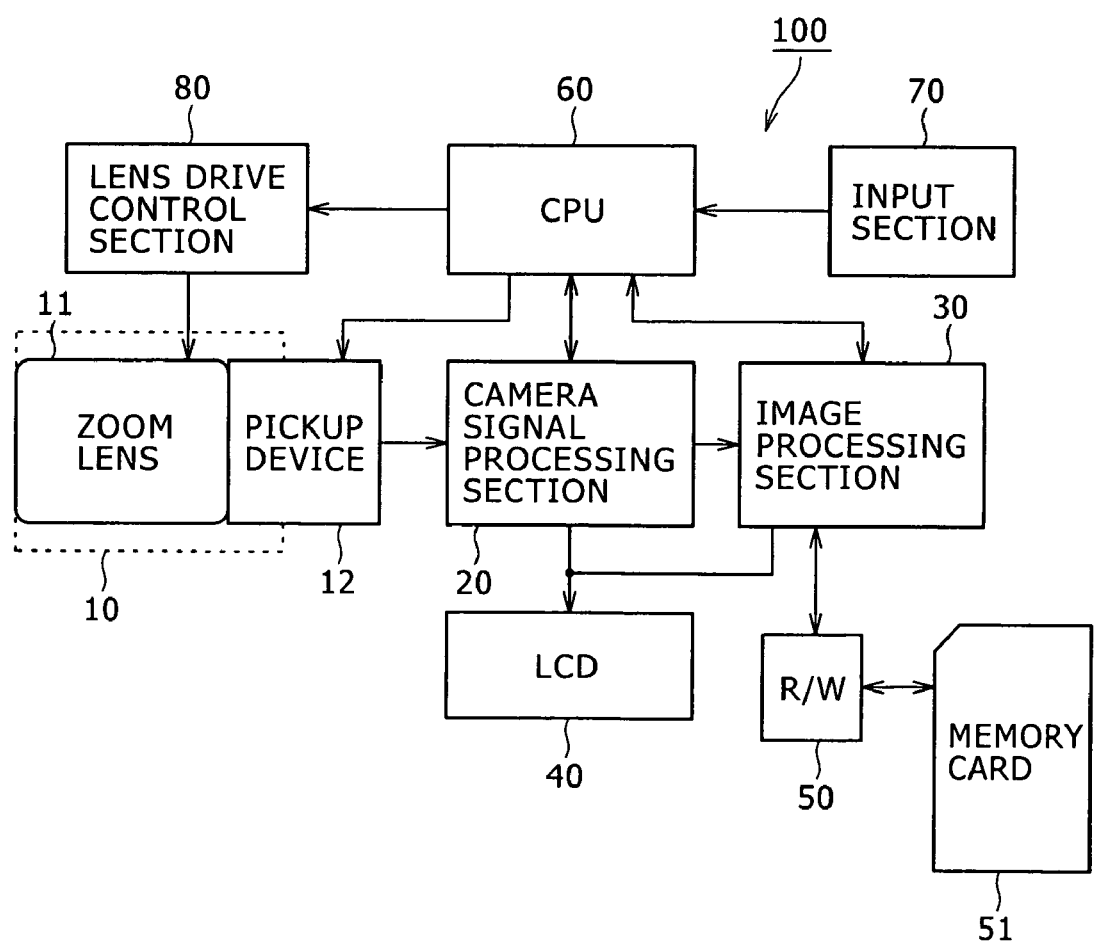
FIG. 17 is a block diagram showing a configuration of an imaging device according to an embodiment of the present invention.

Next, an imaging device, using one of the above-described zoom lenses, according to one embodiment and another embodiment of the present invention will be described. FIG. 17 is a block diagram showing an example configuration of a digital still camera which can be mounted with one of the above-described zoom lenses.

A digital still camera 100 shown in FIG. 17 includes a camera block 10 which performs an imaging function, a camera signal processing section 20 which processes, for example, an image signal for analog-to-digital conversion, an image processing section 30 which records and reproduces an image signal, an LCD (liquid crystal display) 40 which displays a picked-up image, a R/W (reader/writer) 50 which makes writing to and reading from a memory card 51, a CPU 60 which controls the entire imaging device, an input section 70 which a suer uses for input operation, and a lens drive control section 80 which controls lens driving in the camera block 10.

The camera block 10 includes an optical system having a zoom lens 11 (a zoom lens according to one of the foregoing embodiments or a zoom lens associated with one of the examples 1 through 4 of numerical values) and an image pickup device 12 such as CCD. The camera signal processing signal 20 converts a signal outputted from the image pickup device 12 into a digital signal and then processes the digital signal, for example, for noise removal, image quality correction, and conversion into luminance and color difference signals. The image processing section 30 encodes an image signal for compression and decodes the encoded signal for decompression based on a prescribed image data format. It also processes such data as image resolution data for data specification conversion.

The memory card 51 is made up of a detachable semiconductor memory. The R/W 50 writes image data encoded by the image processing section 30 to the memory card 51. It also reads out image data recorded to the memory card 51. The CPU 60 is a control processor which controls, according to instruction signals inputted from the input section 70, circuit blocks included in the digital still camera.

The input section 70 includes, for example, a shutter release button to be used in operating a shutter and a selection switch to be used in selecting operation mode. It outputs instruction signals manually inputted by the user to the CPU 60. The lens drive control section 80 controls, according to a control signal received from the CPU 60, for example, a motor, not shown, which drives lenses included in the zoom lens 11.

Operation of the digital still camera 100 will be briefly described in the following.

In a standby state before shooting, an image signal picked up by the camera block 10 under the control of the CPU 60 is outputted to the LCD 40 via the camera signal processing section 20, so that the image signal is displayed on the LCD 40 as a through image. When an instruction signal for zooming is inputted from the input section 70, the CPU 60 outputs a control signal to the lens drive control section 80. As a result, prescribed lenses included in the zoom lens 11 are moved under the control of the lens drive control section 80.

When the shutter, not shown, included in the camera block 10 is released, the image signal being picked up is outputted to the image processing section 30 via the camera signal processing section 20 where the image signal is encoded for compression thereby being converted into digital data of a prescribed data format. The digital data thus obtained is outputted to the R/W 50 and is then written to the memory card 51.

For focusing, the lens drive control section 80 moves prescribed lenses included in the zoom lens 11 according to a control signal received from the CPU 60, for example, when the shutter release button is pressed halfway or pressed fully for recording.

For reproduction of image data recorded in the memory card 51, the R/W 50 reads out prescribed image data from the memory card 51 in accordance with operation performed at the input section 70. The image data thus read out is decoded for decompression in the image processing section 30 and is, then, outputted as a reproduced image signal to the LCD 40 allowing a reproduced image to be seen on the LCD.

Even though, in the embodiment described above, an imaging device according to an embodiment of the present invention is applied to a digital still camera, it can also be applied to a different imaging device, for example, a video camera.

Shapes and configurations of parts, and numerical values described or shown in describing the above embodiments or in introducing the examples of numerical values are only illustrative of example embodiments, and they should not be interpreted as limiting the technical scope of the invention.

A zoom lens with a variable power ratio of about three and an imaging device which are compact and inexpensive and which are suitable for use in a digital still camera and a digital video camera using a solid-state image pickup device can be provided.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens comprising a first lens group having a negative refractive power, a second lens group having a positive refractive power, and a third lens group having a positive refractive power arranged in the mentioned order from an object side,
   wherein the first lens group includes a negative lens and a positive lens having at least one aspherical surface arranged in the mentioned order from the object side and satisfies a following inequality (1):

$$0.4 < D1/fw < 0.66 \tag{1}$$

where D1 represents a distance, inside the first lens group, between a lens surface closest to an object and a lens surface closest to an image, and fw represents a focal distance with the zoom lens set to a wide-angle position.

2. The zoom lens according to claim 1, wherein each of the lens groups includes a positive lens having at least one aspherical surface.

3. The zoom lens according to claim 2, wherein:
   the second lens group comprises a cemented lens including a positive lens and at least one negative lens, and the cemented lens satisfies following inequalities (2) and (3);

$$0.05 < |Ndp-Ndn| < 0.4 \tag{2}$$

$$2.0 < |vdp-vdn| < 50.0 \tag{3}$$

where
   Ndp: refractive index for d-line of the positive lens included in the cemented lens,
   Ndn: refractive index for d-line of the negative lens included in the cemented lens,
   vpd: Abbe's number of the positive lens included in the cemented lens, and
   vdn: Abbe's number of the negative lens included in the cemented lens.

4. The zoom lens according to claim 3, wherein each of the lens groups is movable during zooming operation.

5. The zoom lens according to claim 2, wherein each of the lens groups is movable during zooming operation.

6. The zoom lens according to claim 1, wherein:
   the second lens group comprises a cemented lens including a positive lens and at least one negative lens, and the cemented lens satisfies following inequalities (2) and (3);

$$0.05 < |Ndp-Ndn| < 0.4 \tag{2}$$

$$2.0 < |vdp-vdn| < 50.0 \tag{3}$$

where
   Ndp: refractive index for d-line of the positive lens included in the cemented lens,
   Ndn: refractive index for d-line of the negative lens included in the cemented lens,
   vpd: Abbe's number of the positive lens included in the cemented lens, and
   vdn: Abbe's number of the negative lens included in the cemented lens.

7. The zoom lens according to claim 6, wherein each of the lens groups is movable during zooming operation.

8. The zoom lens according to claim 1, wherein each of the lens groups is movable during zooming operation.

9. An imaging device comprising a zoom lens and an image pickup device which converts an optical image formed by the zoom lens into an electrical signal:
   wherein the zoom lens includes a first lens group having a negative refractive power, a second lens group having a positive refractive power, and a third lens group having a positive refractive power arranged in the mentioned order from an object side, and
   wherein the first lens group includes a negative lens and a positive lens having at least one aspherical surface arranged in the mentioned order from the object side, and satisfies a following inequality (1);

$$0.4 < D1/fw < 0.66 \tag{1}$$

where D1 represents a distance, inside the first lens group, between a lens surface closest to an object and a lens surface closest to an image, and fw represents a focal distance with the zoom lens set to a wide-angle position.

10. The imaging device according to claim 9, wherein each of the lens groups includes a positive lens having at least one aspherical surface.

11. The imaging device according to claim 10, wherein:
    the second lens group comprises a cemented lens including a positive lens and at least one negative lens, and the cemented lens satisfies following inequalities (2) and (3);

$$0.05 < |Ndp-Ndn| < 0.4 \tag{2}$$

$$2.0 < |vdp-vdn| < 50.0 \tag{3}$$

where
    Ndp: refractive index for d-line of the positive lens included in the cemented lens,
    Ndn: refractive index for d-line of the negative lens included in the cemented lens,
    vpd: Abbe's number of the positive lens included in the cemented lens, and
    vdn: Abbe's number of the negative lens included in the cemented lens.

12. The imaging device according to claim 11, wherein each of the lens groups is movable during zooming operation.

13. The imaging device according to claim 10, wherein each of the lens groups is movable during zooming operation.

14. The imaging device according to claim 9, wherein:
the second lens group comprises a cemented lens including a positive lens and at least one negative lens, and
the cemented lens satisfies following inequalities (2) and (3);

$$0.05<|Ndp-Ndn|<0.4 \quad (2)$$

$$2.0<|vdp-vdn|<50.0 \quad (3)$$

where
Ndp: refractive index for d-line of the positive lens included in the cemented lens,
Ndn: refractive index for d-line of the negative lens included in the cemented lens,
vdp: Abbe's number of the positive lens included in the cemented lens, and
vdn: Abbe's number of the negative lens included in the cemented lens.

15. The imaging device according to claim 14, wherein each of the lens groups is movable during zooming operation.

16. The imaging device according to claim 9, wherein each of the lens groups is movable during zooming operation.

17. An imaging device comprising a zoom lens and an image pickup device which converts an optical image formed by the zoom lens into an electrical signal:
wherein the zoom lens includes a first lens group having a negative refractive power, a second lens group having a positive refractive power, and a third lens group having a positive refractive power arranged in the mentioned order from an object side, and
wherein each of the lens groups includes at least one positive lens having aspherical surfaces on both sides, wherein:
the second lens groups comprises a cemented lens including a positive lens and at least one negative lens, and
the cemented lens satisfies following inequalities (2) and (3);

$$0.05<|Ndp-Ndn|<0.4 \quad (2)$$

$$2.0<|vdp-vdn|<50.0 \quad (3)$$

where
Ndp: refractive index for d-line of the positive lens included in the cemented lens,
Ndn: refractive index for d-line of the negative lens included in the cemented lens,
vdp: Abbe's number of the positive lens included in the cemented lens, and
vdn: Abbe's number of the negative lens included in the cemented lens.

18. The imaging device according to claim 17, wherein each of the lens groups is movable during zooming operation.

* * * * *

UNITED STATES PATENT AND TRADEMARK OFFICE
CERTIFICATE OF CORRECTION

PATENT NO. : 7,177,091 B2  Page 1 of 1
APPLICATION NO. : 11/212875
DATED : February 13, 2007
INVENTOR(S) : Yoshito Iwasawa et al.

It is certified that error appears in the above-identified patent and that said Letters Patent is hereby corrected as shown below:

Column 20, Line 9:
"second lens groups" should read -- second lens group --.

Signed and Sealed this

Thirty-first Day of July, 2007

JON W. DUDAS
*Director of the United States Patent and Trademark Office*